United States Patent [19]
Ogura et al.

[11] Patent Number: 5,172,269
[45] Date of Patent: Dec. 15, 1992

[54] ANTI-REFLECTION FILM FOR PLASTIC OPTICAL COMPONENT

[75] Inventors: Toshiaki Ogura, Hirakata; Nahoko Shimamura, Osaka, both of Japan

[73] Assignee: Matsushita Electric Industrial Co., Ltd., Osaka, Japan

[21] Appl. No.: 542,052

[22] Filed: Jun. 22, 1990

[30] Foreign Application Priority Data

Jun. 26, 1989 [JP] Japan .................. 1-163007

[51] Int. Cl.$^5$ .......................... G02B 1/10; G02B 5/28
[52] U.S. Cl. .................... 359/580; 359/589; 359/581
[58] Field of Search .................. 350/164, 165, 166; 359/580, 581, 582, 586, 589, 618

[56] References Cited

U.S. PATENT DOCUMENTS

| | | | |
|---|---|---|---|
| 4,387,960 | 6/1983 | Tani | 350/164 |
| 4,497,539 | 2/1985 | Sakurai et al. | 350/164 |
| 4,568,140 | 2/1986 | Van der Werf et al. | 350/165 |
| 4,609,267 | 9/1986 | Deguchi et al. | 350/164 |
| 4,979,802 | 12/1990 | Ichikawa | 350/164 |
| 4,988,164 | 1/1991 | Ichikawa | 350/164 |

FOREIGN PATENT DOCUMENTS 60-129701 7/1985 Japan .
63-81402 4/1988 Japan .
63-172201 7/1988 Japan .

*Primary Examiner*—Paul M. Dzierzynski
*Assistant Examiner*—Hung Xuan Dang
*Attorney, Agent, or Firm*—Wenderoth, Lind & Ponack

[57] ABSTRACT

An anti-reflection film to be used for a plastic optical component is excellent in adhesion, durability and optical characteristic as well as be suited for mass-production. The anti-reflection film is a three-layered structure comprising, from the surface of the optical component on which it is formed, a first layer and a second layer which are made of a same dielectric material and a third layer which is a different dielectric material therefrom. Oxygen is introduced when the first layer is formed in order to provide the first layer smaller in refractive index than the second layer. The first and second layers are each made of any of cerium oxide, tantalum pentoxide and hafnium oxide and the third layer is made of silicon dioxide.

14 Claims, 2 Drawing Sheets

ANTI-REFLECTION FILM FOR PLASTIC OPTICAL COMPONENT

BACKGROUND OF THE INVENTION

1. Field of the Invention

This invention relates to an anti-reflection film and more particularly, to an anti-reflection film for a plastic optical component to be used for an optical system such as projection television unit, video camera, still camera or the like.

2. Description of the Prior Art

Conventional optical component such as the lens or the like has employed inorganic glass as a rawmaterial in many cases. Recently, plastic materials are being increasingly introduced as a raw material for optical components due to their advantages that are light in weight, easy to manufacture and superior in mass- production performance. However, an optical component made of plastic material disadvantageously arises such a problem that surface reflection is so large as the inorganic glass does. In order to eliminate such disadvantage, the same material as the inorganic glass can be coated as an anti-reflection film on the surface of a plastic optical component. Anti-reflection film to be used for this purpose is generally formed by the vacuum evaporation technique As an anti-reflection film using one kind of material to be evaporated, a single-layered anti-reflection film of magnesium fluoride ($MgF_2$) is well-known. Anti-reflection film using SiO only is also in the prior art (see U.S. Pat. No. 4,497,539). As an anti-refection film using two kinds of materials to be evaporated, a three-layered anti-reflection film of silicon dioxide ($SiO_2$) and magnesium fluoride ($MgF_2$) and a two-layered anti-reflection film of cerium oxide ($CeO_2$) and silicon oxide ($SiO_x$) are disclosed in Japanese Patent Application Laid - Open No. 60-129701 and Japanese Patent Application Laid - Open No. 63-172201, respectively. In addition, as an anti-reflection film using three or more kinds of materials to be evaporated, a three-layered anti-reflection film of silicon dioxide ($SiO_2$), aluminum oxide ($Al_2O_3$) and cerium oxide ($CeO_2$) has been proposed (see Japanese Patent Application Laid-Open No. 63-81402).

When a single-layered anti-reflection film is to be formed of magnesium fluoride by the vacuum evaporation technique, for example, due to such facts that plastic material is low in flow temperature and heat distortion temperature as well as allows to radiate a gas from the inside thereof, it cannot be formed as a hard anti-reflection film using such a board heating process that is carried out when an anti-reflection film is formed on the surface of an inorganic glass component (in which the heating temperature ranges from 300° to 400° C. in general). As a result, the formation of an anti-reflection film on the surface of a plastic optical component is carried out at a low temperature of 50° to 60° C. However, the anti-reflection film thus obtained is low in crystallinity of magnesium fluoride, which means that the obtained film is extremely vulnerably soft, resulting in reduction in durability. As a result, in order to improve the adhesion of an anti-reflection film and the surface of, a plastic optical plastic optical component is heated to a temperature of 60° to 80 ° C. for vacuum evaporation or that the RF ion plating technique is used to form an anti-reflection film thereon. However, these methods require delicate controls of evaporation conditions, and easily cause cracks in the anti-reflection film during formation. It is difficult to constantly keep the forming conditions preventive from crack formation as well as to maintain the surface condition of a plastic optical component constant. Also, these methods are not suited to mass- production. In addition, plastic materials such as polymethyl methacrylate (PMMA) and diallyl glycol carbonate (CR39), which are frequently used as a raw material of optical components, are low in refractive index as about 1.49 and 1.50, respectively, so that in case of a single-layered anti-reflection film of magnesium fluoride (with a refractive index of about 1.38), a residual reflectance of about 1.5% exists, thus being unable to provide a suitable characteristic to the anti-reflection film.

Referring to the conventionally proposed three-layered anti-reflection film using silicon monoxide only (see U.S. Pat. No. 4,497,539), the silicon monoxide (SiO) as a material to be evaporated is well known to change the refractive index largely depending on evaporation conditions, ranging from about 1.50 to 1.90. The refractive index of SiO is subject to aging and as a result, there arises such a problem that the optical characteristic as an anti-reflection film will become unstable.

Referring to the three-layered anti-reflection film using magnesium fluoride and silicon dioxide (see Japanese Patent Application Laid-Open No.60-129701), a magnesium fluoride layer is sandwiched between two silicon oxide films, so that no formation of crack and comparatively good durability can be obtained. However, it has a residual reflectance as large as that of a single-layered anti-reflection film, being unable to provide a suitable characteristic thereto.

Further, referring to the two-layered anti-reflection film using cerium oxide and silicon oxide (see Japanese Patent Application Laid-Open No.63-172201), the refractive index of $SiO_x$ as a thin film material is subject to aging, so that there arises some problems on the stability of optical characteristics.

In addition, referring to the anti-reflection film using three or more kinds of materials to be evaporated (see Japanese Patent Application Laid-Open No. 63-81402), there requires material managements, resulting an increase in manufacturing cost.

As explained above, conventionally proposed anti-reflection films to be used for plastic optical components have been pointed out such that they are low in adhesion with a plastic surface, inferior in durability, unsatisfactory in optical characteristic as an anti-reflection film and unstable in the optical characteristic as well as not suited to mass- production.

SUMMARY OF THE INVENTION

An object of this invention is to provide an anti-reflection film which is high in adhesion with the surface of a plastic optical component on which the anti-reflection film is formed and excellent in durability and optical characteristic or low in spectral reflection factor and suitable for mass- production.

In order to attain the above-mentioned object, an anti-reflection film of this invention is a three-layered film evaporatively formed on a surface of a plastic optical component, which comprises a first layer, a second layer and a third layer in the order from the surface of the plastic optical component. The first and second layers are respectively thin films made of a same oxide dielectric material and the third film is a thin film made of a different dielectric material from those of the first and second layers. The first and second layers are each made of an oxide dielectric material of any of cerium oxide ($CeO_2$), tantalum pentoxide ($Ta_2O_5$) and hafnium oxide ($HfO_2$) and the third layer is made of an oxide dielectric material of silicon dioxide ($SiO_2$).

In addition, a thin film made of an oxide dielectric material as the first layer is formed under introduction of oxygen.

With the anti-reflection film formed as described above, each layer has a refractive index satisfying the following conditions:

$$n3 < n1 < n2.$$

Also, the product of refractive index and film thickness of each layer, or the optical film thickness of each layer, is substantially practical, for example, when the following conditions are satisfied (the symbol*denotes muliplication):

$$n1*d1 = n2*d2 = n3*d3 = \lambda/4, \quad (1)$$

or $$n1*d1 = n2*d2/2 = n3*d3 = \lambda/4 \quad (2)$$

where
- n1 = refractive index of the first layer
- n2 = refractive index of the second layer
- n3 = refractive index of the third layer
- d1 = film thickness of the first layer
- d2 = film thickness of the second layer
- d3 = film thickness of the third layer
- n1*d1 = optical film thickness of the first layer
- n2*d2 = optical film thickness of the second layer
- n3*d3 = optical film thickness of the third layer
- λ = center wavelength in designing.

By forming as shown above, an anti-reflection film for plastic optical components of this invention provides the following effects:

(1) Formation of a thin film as the first layer under the introduction of oxygen makes possible to provide excellent adhesion of the thin film with the plastic surface on which it is formed.

(2) The first and second layers are respectively made of the same oxide dielectric material, but the first one is formed under the introduction of oxygen during formation, so that the first layer can be made smaller in refractive index than the second layer. As a result, by matching the refractive index of the first layer film with that of the third layer film, a three-layered anti-reflection film having excellent characteristics can be obtained. By increasing the refractive index of the second layer, that is, by increasing the packing density of the second layer film compared with the first layer film, durability of the film can be improved. In addition, the third layer film is made of silicon dioxide ($SiO_2$) thereby improving the durability of the entire anti-reflection film.

The following tests were carried out on adhesion and durability:

(a) Peel test

The peel testing was made in such a way that a sample to be tested was remained to stand at 40° C. and 85% relative humidity for 1,000 hours, then an adhesive tape was adhered on the surface of the sample and peeled.

(b) Moisture resistance test

The moisture resistance was tested by holding samples under atmospheric conditions of 40° C. and 95% relative humidity for 1,000 hours.

(c) Thermal shock test

The thermal shock test was repeated for about 100 hours on samples to hold them at −30° C. and 70° C. respectively for 30 minutes under a high humidity condition.

Even after the above-mentioned testings have been imposed upon, anti-reflection films can be obtained with no problem.

(3) Anti-reflection film is made of two kinds of material to be evaporated, resulting in an ease in material management and volume production.

DESCRIPTION OF THE PREFERRED EMBODIMENTS

Figure 1:
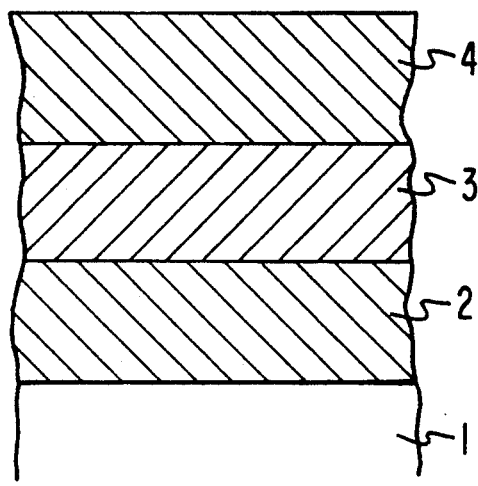
FIG. 1 is a cross-sectional view of an anti-reflection film of this invention.

FIG. 1 is a cross-sectional view of an anti-reflection film of this invention. In which, the reference numeral 1 indicates a plastic optical component such as, for example, a plastic lens, for the raw material of which polymethyl methacrylate, diallyl glycol carbonate, polycarbonate or the like can be used. The reference numerals 2 and 3 respectively indicate first and second layers which are thin films made of a same oxide dielectric material. As the oxide dielectric material, any of cerium oxide, tantalum pentoxide and hafnium oxide can be used. Only when the first layer 2 of thin film is to be formed, oxygen is introduced. A third layer 4 is a thin film made of a different dielectric material from those of the first and second layers 2 and 3. The third layer 4 is made of silicon dioxide. With the anti-reflection film formed as described above, the refractive indices of the first, second and third layers satisfy the following conditions:

$$n3 < n1 < n2$$

The product of refractive index and film thickness of each layer (or the optical film thickness of each layer) is substantially practical when the following conditions are satisfied:

$$n1*d1 = n2*d2 = n3*d3 = \lambda/4, \quad (1)$$

or $$n1*d1 = n2*d2/2 = n3\ d3 = \lambda/4, \quad (2)$$

where
- n1 = refractive index of the first layer
- n2 = refractive index of the second layer
- n3 = refractive index of the third layer d1 = film thickness of the first layer
d2 = film thickness of the second layer
d3 = film thickness of the third layer
n1*d1 = optical film thickness of the first layer
n2*d2 = optical film thickness of the second layer
n3*d3 = optical film thickness of the third layer
λ = center wavelength in designing.

EMBODIMENT 1

Figure 2:
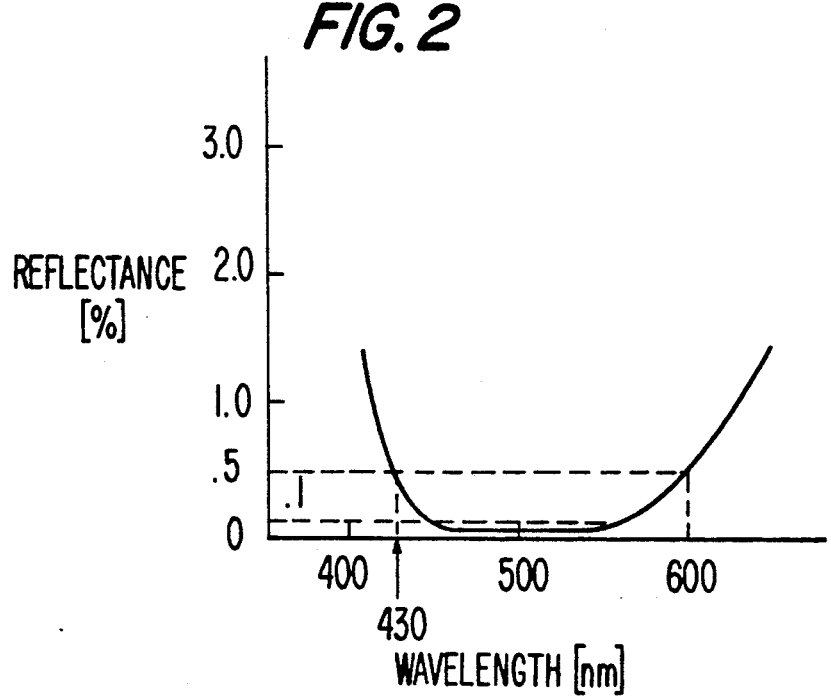
FIG. 2 to 4 show a spectral reflection characteristic of an anti-reflection film according to Embodiments 1 to 3 of this invention, respectively.

In FIG. 1, an anti-reflection film according to this embodiment of this invention comprises a plastic lens 1, a first layer 2 and second layer 3 which are each made of cerium oxide and a third layer 4 which is made of silicon dioxide, the concrete contents of which are detailed in Table 1. FIG. 2 shows the spectral reflection characteristic of the anti-reflection film of this embodiment. In this methacrylate (PMMA).

TABLE 1

| EMBODIMENT 1 | Material | Refractive Index | Optical Thickness | Vacuum (Torr) |
| --- | --- | --- | --- | --- |
| Third layer | $SiO_2$ | 1.46 | λ/4 | $<1.5 \times 10^{-5}$ |
| Second layer | $CeO_2$ | 2.10 | λ/4 | $<1.5 \times 10^{-5}$ |
| First layer | $CeO_2$ | 1.80 | λ/4 | $3.0 - 5.0 \times 10^{-5}$ |
| Plastic lens | PMMA | 1.49 | — | — |

The method of forming each layer of this embodiment will be explained below.

The first layer 2 was formed through procedures that the plastic lens 1 was placed in a vacuum chamber held at $1.0 \times 10^{-5}$ Torr, then oxygen was introduced thereinto up to produce a vacuum of 3.0 to $5.0 \times 10^{-5}$ Torr and cerium oxide was evaporated on the surface of the plastic lens 1 using an electron beam evaporation method at an evaporation rate of 5 to 8 Å/sec to form the first layer 2 with an optical film thickness of λ/4 (λ=500 nm) thereon. The first layer 2 of cerium oxide thus obtained exhibited a refractive index of 1.80. Next, the introduction of oxygen was stopped and then cerium oxide was evaporated on the first layer 2 thus formed using the electron beam evaporation method at an evaporation rate of 10 to 15 Å/sec under a vacuum condition of $5 \times 10^{-5}$ Torr or less to form the second layer 3 with an optical film thickness of λ/4 (λ=500 nm) thereon. The second layer 3 of cerium thus obtained exhibited a refractive index of 2.10. Thereafter, silicon dioxide was evaporated thereon similarly using the electron beam evaporation method at an evaporation rate of 7 to 15 Å/sec to form the third layer 4 with an optical thickness of λ/4 (λ=500 nm). The silicon oxide film thus obtained exhibited a refractive index of 1.46. Tests carried out to make sure of the adhesion and durability characteristics of the anti-reflection film of this embodiment are summarized in Table 2.

TABLE 2

| Tests | Results |
| --- | --- |
| Peel | Good |
| Humidity resistance | Good |
| Thermal shock | Good |

As seen from Table 2, the anti-reflection film of this invention can provide excellent adhesion and durability characteristics. Conventionally, crack formation might be observed when an anti-reflection is formed. In this embodiment, however, a stable anti-reflection film could be always obtained. Also, referring to the spectral reflection characteristic, the reflectance at the center wavelength (λ=500 nm) was below 0.1% and reflectance below 0.5% were obtained in the wavelength range of 430 to 600 nm as shown in FIG. 2.

EMBODIMENT 2

Figure 3:
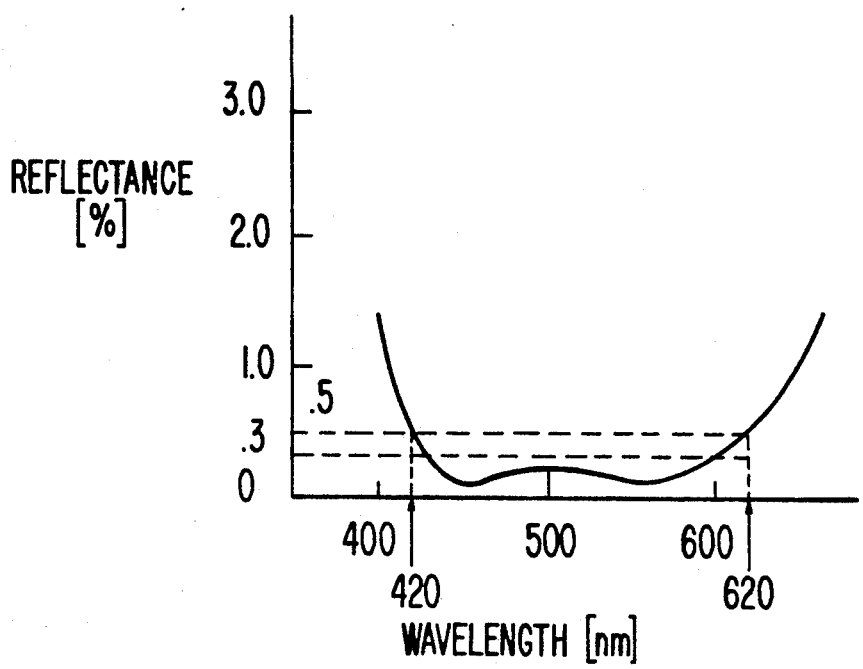

In FIG. 1, an anti-reflection film according to this embodiment of this invention comprises a plastic lens 1, a first layer 2 and a second layer 3 which are each made of tantalum pentoxide and a third layer 4 which is made of silicon dioxide, the concrete contents of which are detailed in Table 3. FIG. 3 shows the spectral reflection characteristic of the anti-reflection film of this embodiment. In this embodiment, the plastic lens 1 was made of diallyl glycol carbonate (CR39).

TABLE 3

| EMBODIMENT 1 | Material | Refractive Index | Optical Thickness | Vacuum (Torr) |
| --- | --- | --- | --- | --- |
| Third layer | $SiO_2$ | 1.46 | λ/4 | $<1.5 \times 10^{-5}$ |
| Second layer | $Ta_2O_5$ | 2.05 | λ/4 | $<1.5 \times 10^{-5}$ |
| First layer | $Ta_2O_5$ | 1.80 | λ/4 | $1.0 \times 10^{-4}$ |
| Plastic lens | CR39 | 1.50 | — | — |

Each layer was formed through procedures as follows:

The plastic lens 1 was placed in a vacuum chamber held at $1.0 \times 10^{-5}$ Torr, then oxygen was introduced thereinto up to produce a vacuum of $1.0 \times 10^{-4}$ Torr and tantalum pentoxide was evaporated on the surface thereof using an electron beam evaporation method at an evaporation rate of 5 to 8 Å/sec to form the first layer 2 with an optical thickness of λ/4 (λ=500 nm). The tantalum pentoxide film thus obtained exhibited a refractive index of 1.80. Next, the introduction of oxygen was stopped and then tantalum pentoxide was evaporated on the first layer 2 thus formed using the electron beam evaporation method at an evaporation rate of 12 to 15 Å/sec under a vacuum condition of $1.5 \times 10^{-5}$ Torr or less to form the second layer 3 with an optical thickness of λ/4 (λ=500 nm). The tantalum pentoxide film thus obtained exhibited a refractive index of 2.05. Then, silicon dioxide was evaporated on the second layer 3 thus obtained similarly using the electron beam evaporation method at an evaporation rate of 7 to 15 Å/sec to form the third layer 4 with an optical thickness of λ/4 (λ=500 nm). The third layer 4 of silicon dioxide thus formed exhibited a refractive index of 1.46. Here, tests carried out to make sure of adhesion and durability characteristics of the anti-reflection film of this embodiment are summarized in Table 4.

TABLE 4

| Tests | Results |
| --- | --- |
| Peel | Good |
| Humidity resistance | Good |

TABLE 4-continued

| Tests | Results |
| --- | --- |
| Thermal shock | Good |

As seen from Table 4, the anti-reflection of this invention is excellent in adhesion and durability characteristics. Conventionally, crack formation might be observed when an anti-reflection film is formed. In this embodiment, however, a stable anti-reflection film could be always obtained. Also, referring to the spectral reflection characteristic, as seen from FIG. 3, the reflectance at the center wavelength ($\lambda=500$ nm) was below 0.3% and reflectances below 0.5% were obtained in the wavelength range of 420 to 620 nm.

EMBODIMENT 3

Figure 4:
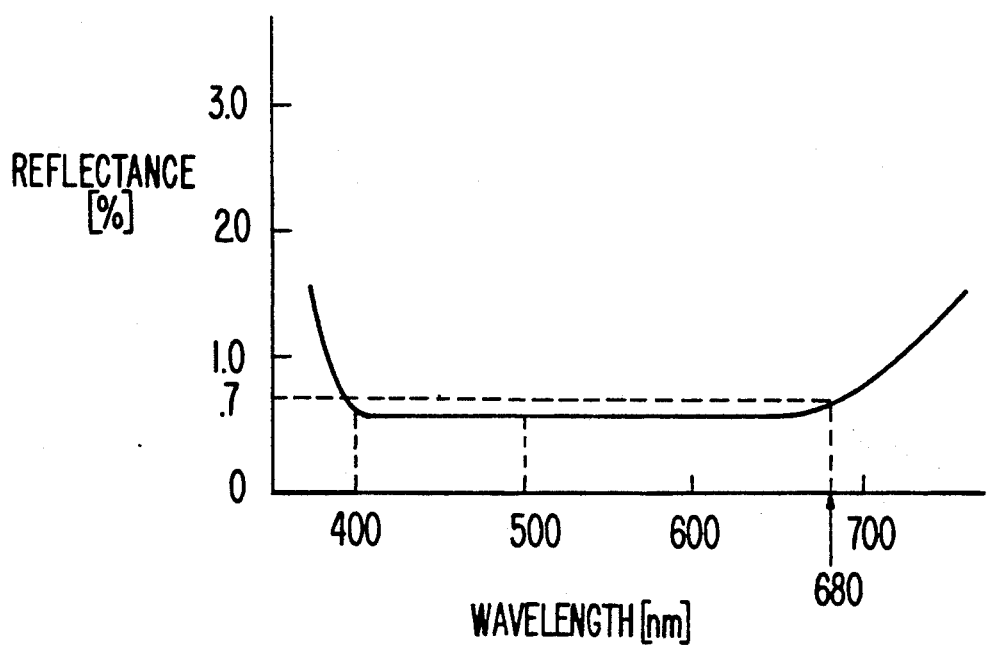

In FIG. 1, an anti-reflection film according to this embodiment of this invention comprises a plastic lens 1, a first layer 2 and second layer 3 which are each made of hafnium oxide and a third layer 4 which is made of silicon dioxide, the concrete contents of which are detailed in Table 5. FIG. 4 shows its spectral reflection characteristic. The plastic lens 1 of this embodiment was made of polycarbonate (PC).

TABLE 5

| EMBODIMENT 1 | Material | Refractive Index | Optical Thickness | Vacuum (Torr) |
| --- | --- | --- | --- | --- |
| Third layer | SiO$_2$ | 1.46 | $\lambda/4$ | $<1.5 \times 10^{-5}$ |
| Second layer | HfO$_2$ | 2.00 | $\lambda/2$ | $<1.5 \times 10^{-5}$ |
| First layer | HfO2 | 1.70 | $\lambda/4$ | $5.0 \times 10^{-5} - \times 1.0 \times 10^{-4}$ |
| Plastic lens | PC | 1.58 | — | — |

Each layer was formed through procedures as follows;

The plastic lens 1 was placed in a vacuum chamber held at a vacuum of $1.0 \times 10^{-5}$ Torr, then oxygen was introduced thereinto up to produce a vacuum of $5.0 \times 10^{-5}$ to $1.0 \times 10^{-4}$ Torr and hafnium oxide was evaporated on the surface of the lens 1 using an electron beam evaporation method at an evaporation rate of 12 to 15 Å/sec to form the first layer 2 with an optical thickness of $\lambda/4$ ($\lambda=500$ nm). The first layer 2 of hafnium oxide thus formed exhibited a refractive index of 1.70. Next, the introduction of oxygen was stopped and then hafnium oxide was evaporated on the first layer 2 thus formed using the electron beam evaporation method at an evaporation rate of 3 to 7 Å/sec under a vacuum condition of $1.5 \times 10^{-5}$ Torr or less to form the second layer 3 with an optical thickness of $\lambda/2$ ($\lambda=500$ nm). The second layer 3 of hafnium oxide thus formed exhibited a refractive index of 2.00. Then, silicon dioxide was evaporated on the second layer 3 thus obtained similarly using the electron beam evaporation method at an evaporation rate of 7 to 15 Å/sec to form the third layer 4 with an optical thickness of $\lambda/4$ ($\lambda=500$ nm). The third layer 4 of silicon dioxide thus obtained exhibited a refractive index of 1.46. Here, tests carried out to make sure of adhesion and durability characteristics of the anti-reflection film of this embodiment are summarized in Table 6.

TABLE 6

| Tests | Results |
| --- | --- |
| Peel | Good |
| Humidity resistance | Good |
| Thermal shock | Good |

As seen from Table 6, the anti-reflection film of this invention is excellent in adhesion and durability characteristics. Conventionally, crack formation might be observed when an anti-refection film is formed. In this embodiment, however, a stable anti-reflection film could be always obtained. Also, referring to the spectral reflection characteristic of the film of this embodiment, as seen from FIG. 4, the reflectance at the center wavelength ($\lambda=500$ nm) was below 0.7% and reflectances below 0.7% were obtained in the wavelength range of 400 to 680 nm.

In addition, film thicknesses of layers of each of Embodiments 1,2 and 3 are defined as shown in Tables 1,2 and 3, respectively, but not to be limited thereby. These film thicknesses can be changed in accordance with the design wavelength.

What is claimed is:

1. An anti-reflection film formed on a surface of a plastic optical components, said anti-reflection film comprising:
    a first layer formed on said surface of said optical component and made of a first dielectric material;
    a second layer formed on said first layer, said second layer being made of said first dielectric material and different in refractive index from said first layer; and
    a third layer formed on said second layer and made of a second dielectric material which is different from said first dielectric material.

2. An anti-reflection film as claimed in claim 1, satisfying the following conditions:

$$n3 < n1 < n2$$

where
n1 = refractive index of said first layer
n2 = refractive index of said second layer
n3 = refractive index of said third layer 3. An anti-reflection film as claimed in claim 1, satisfying the following conditions:

$$n1*d1 = n2*d2 = n3*d3 = \lambda/4$$

where
n1 = refractive index of said first layer
n2 = refractive index of said second layer
n3 = refractive index of said third layer
d1 = film thickness of said first layer
d2 = film thickness of said second layer
n1*d1 = optical film thickness of said first layer
n2*d2 = optical film thickness of said second layer
n3*d3 = optical film thickness of said third layer
$\lambda$ = center wavelength in designing.

4. An anti-reflection film as claimed in claim 1, satisfying the following conditions:

$$n1*d1 = n2*d2/2 = n3*d3 = \lambda/4$$

where
- n1 = refractive index of said first layer
- n2 = refractive index of said second layer
- n3 = refractive index of said third layer
- d1 = film thickness of said first layer
- d2 = film thickness of said second layer
- d3 = film thickness of said third layer
- n1*d1 = optical film thickness of said first layer
- n2*d2 = optical film thickness of said second layer
- n3*d3 = optical film thickness of said third layer
- λ = center wavelength in designing.

5. An anti-reflection film as claimed in claim 1, wherein said first and second layers are each made of cerium oxide and said third layer is made of silicon dioxide.

6. An anti-reflection film as claimed in claim 1, wherein said first and second layers are each made of tantalum pentoxide and said third layer is made of silicon dioxide.

7. An anti-reflection film as claimed in claim 1, wherein said first and second layers are each made of hafnium oxide and said third layer is made of silicon dioxide.

8. An anti-reflection film formed on a surface of a plastic optical component, said anti-reflection film comprising:
- a first layer formed on said surface of said optical component by evaporating a first dielectric material on said surface in a vacuum chamber while introducing oxygen into said vacuum chamber;
- a second layer formed on said first layer by evaporating said first dielectric material on said first layer in said vacuum chamber without introducing oxygen so that said second layer is different in refractive index from said first layer; and
- a third layer formed on said second layer by evaporating on said second layer a second dielectric material which is different from said first dielectric material.

9. An anti-reflection film as claimed in claim 8, satisfying the following condition:

$$n3 < n1 < n2$$

where
- n1 = refractive index of said first layer
- n2 = refractive index of said second layer
- n3 = refractive index of said third layer.

10. An anti-reflection film as claimed in claim 1, satisfying the following condition:

$$n1*d1 = n2*d2 = n3*d3 = \lambda/4$$

where
- n1 = refractive index of said first layer
- n2 = refractive index of said second layer
- n3 = refractive index of said third layer
- d1 = film thickness of said first layer
- d2 = film thickness of said second layer
- d3 = film thickness of said third layer
- n1*d1 = optical film thickness of said first layer
- n2*d2 = optical film thickness of said second layer
- n3*d3 = optical film thickness of said third layer
- λ = center wavelength in designing.

11. An anti-reflection film as claimed in claim 8, satisfying the following condition:

$$n1*d1 = n2*d2/2 = n3*d3 = \lambda/4$$

where
- n1 = refractive index of said first layer
- n2 = refractive index of said second layer
- n3 = refractive index of said third layer
- d1 = film thickness of said first layer
- d2 = film thickness of said second layer
- d3 = film thickness of said third layer
- n1*d1 = optical film thickness of said first layer
- n2*d2 = optical film thickness of said second layer
- n3*d3 = optical film thickness of said third layer
- λ = center wavelength in designing.

12. An anti-reflection film as claimed in claim 8, wherein said first and second layers are each made of tantalum pentoxide and said third layer is made of silicon dioxide.

13. An anti-reflection film as claimed in claim 8, wherein said first and second layers are each made of tantalum pentoxide and said third layer is made of silicon dioxide.

14. An anti-reflection film as claimed in claim 8, wherein said first and second layers are each made of hafnium oxide and said third layer is made of silicon dioxide.

* * * * *